(12) United States Patent
Sharma et al.

(10) Patent No.: US 9,378,190 B2
(45) Date of Patent: *Jun. 28, 2016

(54) WORD PROCESSOR DATA ORGANIZATION

(71) Applicant: Google Inc., Mountain View, CA (US)

(72) Inventors: Ramna Sharma, El Dorado Hills, CA (US); Nandan Nidhi, Noida (IN); Suvrat Sharma, Noida (IN); Ganesh Gupta, Noida (IN)

(73) Assignee: Google Inc., Mountain View, CA (US)

( * ) Notice: Subject to any disclaimer, the term of this patent is extended or adjusted under 35 U.S.C. 154(b) by 256 days.

This patent is subject to a terminal disclaimer.

(21) Appl. No.: 13/887,950

(22) Filed: May 6, 2013

(65) Prior Publication Data

US 2015/0193382 A1 Jul. 9, 2015

Related U.S. Application Data

(63) Continuation of application No. 13/346,221, filed on Jan. 9, 2012, now Pat. No. 8,458,213, which is a continuation of application No. 12/023,929, filed on Jan. 31, 2008, now Pat. No. 8,095,575.

(60) Provisional application No. 60/887,358, filed on Jan. 31, 2007.

(51) Int. Cl.
| | |
|---|---|
| *G06F 17/30* | (2006.01) |
| *G06F 17/21* | (2006.01) |
| *G06F 17/22* | (2006.01) |
| *G06F 17/24* | (2006.01) |

(52) U.S. Cl.
CPC ............ *G06F 17/212* (2013.01); *G06F 17/211* (2013.01); *G06F 17/2205* (2013.01); *G06F 17/24* (2013.01); *Y10S 707/917* (2013.01)

(58) Field of Classification Search
CPC . G06F 17/211; G06F 17/212; G06F 17/2205; G06F 17/24
See application file for complete search history.

(56) References Cited

U.S. PATENT DOCUMENTS

| | | | |
|---|---|---|---|
| 4,586,156 A | 4/1986 | Kurata et al. | |
| 4,771,385 A | 9/1988 | Egami et al. | |
| 4,959,769 A | 9/1990 | Cooper et al. | |
| 5,142,618 A * | 8/1992 | Fujiwara | G06F 9/4443 715/210 |
| 5,189,731 A * | 2/1993 | Sakamoto | G06F 17/272 358/1.18 |
| 5,608,625 A | 3/1997 | Bailey | |
| 5,860,073 A | 1/1999 | Ferrel et al. | |
| 5,890,103 A | 3/1999 | Carus | |
| 6,426,751 B1 * | 7/2002 | Patel | G06F 17/214 345/468 |
| 6,466,901 B1 | 10/2002 | Loofbourrow et al. | |
| 6,834,276 B1 * | 12/2004 | Jensen | G06F 17/30882 |
| 6,993,527 B1 | 1/2006 | Raman et al. | |
| 7,024,622 B1 | 4/2006 | Young | |

(Continued)

*Primary Examiner* — Robert Beausoliel, Jr.
*Assistant Examiner* — Nirav K Khakhar
(74) *Attorney, Agent, or Firm* — Fish & Richardson P.C.

(57) ABSTRACT

A computer-implemented word processing presentation method is disclosed. The method includes obtaining an unformatted data structure containing a series of characters representing content for a word processing document, accessing a series of first records in a file associated with the unformatted data structure, wherein each first record contains data correlating a location of one or more characters in the unformatted data structure to a location for the one or more characters in the word processing document, and generating a display of the word processing document by applying the correlating data from the series of records to the series of characters in the unformatted data structure.

20 Claims, 12 Drawing Sheets

(56) References Cited

U.S. PATENT DOCUMENTS

| | | | |
|---|---|---|---|
| 7,064,757 B1 * | 6/2006 | Opstad | G06F 17/214 345/467 |
| 7,137,072 B2 | 11/2006 | Bauer et al. | |
| 7,340,673 B2 | 3/2008 | Malone | |
| 7,793,224 B1 | 9/2010 | Ayers | |
| 8,095,575 B1 | 1/2012 | Sharma et al. | |
| 8,458,231 B1 * | 6/2013 | Sharma | G06F 17/211 707/811 |
| 2001/0032218 A1 | 10/2001 | Huang | |
| 2002/0065848 A1 | 5/2002 | Walker et al. | |
| 2004/0117734 A1 | 6/2004 | Krickhahn | |
| 2004/0205666 A1 | 10/2004 | Poynor | |
| 2006/0248440 A1 | 11/2006 | Rhoads et al. | |

* cited by examiner

| 7 | 6 | 5 | 4 | 3 | 2 | 1 | 0 |
|---|---|---|---|---|---|---|---|
| Link | Font Size | Font Size | Font Size | Underline | Italic | Bold | Reserved |
| - | - | Ordered List | Unordered List | Indentation | Indentation | Indentation | Reserved |

FIG. 3A

Bold, Italic, and Underline Format Identifier Representation

Format ID: 14 (1110 = 8+4+2)

| 0 | 0 | 0 | 0 | 1 | 1 | 1 | 0 |
|---|---|---|---|---|---|---|---|

FIG. 3B

Ordered List Item Format Identifier Representation

Format ID: 33 (100011 = 32+2+1)

| 0 | 0 | 1 | 0 | 0 | 0 | 0 | 1 |
|---|---|---|---|---|---|---|---|

FIG. 3C

Step 1: Start with a new document

View State: ""

Buffer State

|  |  |  |  |  |  |  |  |  |  |  |  |  |  |  |  |
|---|---|---|---|---|---|---|---|---|---|---|---|---|---|---|---|

Step 2: Type "This is a test"

View: "This is a test"

Buffer State

| T | h | i | s |  | i | s |  | a |  | t | e | s | t |
|---|---|---|---|---|---|---|---|---|---|---|---|---|---|

Step 3: Delete "test" and type "sample"

View: "This is a sample"

Buffer State

| T | h | i | s |  | i | s |  | a |  | t | e | s | t | s | a | m | p | l | e |
|---|---|---|---|---|---|---|---|---|---|---|---|---|---|---|---|---|---|---|---|

Step 4: Insert "new " between "a" and "sample"

View: "This is a new sample"

Buffer State

| T | h | i | s |  | i | s |  | a |  | t | e | s | t | s | a | m | p | l | e | n | e | w |
|---|---|---|---|---|---|---|---|---|---|---|---|---|---|---|---|---|---|---|---|---|---|---|

FIG. 4C

| Buffer Insert Position | Buffer Insert Length | Selection Start | Selection Length | Remove Length | Paragraph Edit Index | Char Format Edit Index |
|---|---|---|---|---|---|---|

FIG. 5A

| Buffer Insert Position | Buffer Insert Count | Selection Start | Selection Count |
|---|---|---|---|

FIG. 5B

Step 1: Type "A test"

Buffer: "A test"     View: "A test"

| Insert Position | Insert Length | Selection Start | Selection Length | Remove Length | Paragraph Edit Index |
|---|---|---|---|---|---|
| 0 | 6 | 0 | 0 | 0 | 0 |

| Insert Position | Insert Count | Selection Start | Selection Count |
|---|---|---|---|
| 0 | 1 | 0 | 0 |

Step 2: Insert "simple " before "test"

Buffer: "A testsimple "     View: "A simple test"

| | | | | | |
|---|---|---|---|---|---|
| 0 | 6 | 0 | 0 | 0 | 0 |
| 6 | 7 | 2 | 0 | 0 | -1 |

Step 3: Press backspace before "t" of "test"

Buffer: "A testsimple "     View: "A simpletest"

| | | | | | |
|---|---|---|---|---|---|
| 0 | 6 | 0 | 0 | 0 | 0 |
| 6 | 7 | 2 | 0 | 0 | -1 |
| 13 | 0 | 8 | 0 | 1 | -1 |

Step 3: Press enter before "t" of "test"

Buffer: "A testsimple \n"     View: "A simple<cr>test"

| | | | | | |
|---|---|---|---|---|---|
| 0 | 6 | 0 | 0 | 0 | 0 |
| 6 | 7 | 2 | 0 | 0 | -1 |
| 13 | 0 | 8 | 0 | 1 | -1 |
| 13 | 1 | 8 | 0 | 0 | 1 |

| | | | |
|---|---|---|---|
| 0 | 1 | 0 | 0 |
| 1 | 2 | 0 | 1 |

FIG. 5C

```
<Document Name="SampleFile">
    <Paragraph FormatID="1" Length="74">
        <Content FormatID="2">
            Bold Paragraph Block
        </Content>
        <Content FormatID="0">
            Normal Paragraph Block
        </Content>
        <Content FormatID="12">
            Underline Italic Paragraph Block
        </Content>
        ...
    </Paragraph>
    <Paragraph FormatID="33" Length="24">
        <Content FormatID="0">
            Normal Ordered List Item
        </Content>
        ...
    </Paragraph>
    <Paragraph FormatID="17" Length="26">
        <Content FormatID="4">
            Italic Unordered List Item
        </Content>
        ...
    </Paragraph>
    ...
</Document>
```

FIG. 8

WORD PROCESSOR DATA ORGANIZATION

CROSS-REFERENCE TO RELATED APPLICATIONS

This application is a continuation of and claims priority under 35 U.S.C. §120 to U.S. patent application Ser. No. 13/346,221, filed on Jan. 9, 2012, which claims priority to U.S. patent application Ser. No. 12/023,929, issued as U.S. Pat. No. 8,095,575 and filed on Jan. 31, 2008, which claims priority to U.S. Provisional Application Ser. No. 60/887,358, filed on Jan. 31, 2007, the contents of which are hereby incorporated by reference.

TECHNICAL FIELD

This document relates to systems and techniques for providing efficient text editing and formatting for documents such as word processing documents.

BACKGROUND

Many conventional word processors represent a formatted document using a tree of style and content object nodes. This kind of structure can cause such a system to have duplicate style objects and also to have complex and inefficient manipulation involving merging and splitting of style and content objects. For example, such a document may have as many bold style objects as the number of bold text components it embodies. Also, when some editing operation results in two consecutive similar styles, the style objects and their associated content will typically be merged into one style object, and the reverse will happen when a paragraph is split into two paragraphs. This kind of style and content object manipulation can become even more complex and error prone from the implementation viewpoint during copy/paste and undo-redo operations. In particular, when document content is moved around within the document, the style and content objects may need to be moved within the tree structure, and incorporated into a new location in such a structure. Likewise, the saving of information needed to complete undo operations can be difficult in terms of matching the undo information to the tree structure.

SUMMARY

This document describes systems and techniques that may be used to receive document content, to organize the content with layout and formatting information for the content, to store such information, and to present the information, such as by presenting a document containing the content and laid out and formatted in an appropriate manner.

In general, characters submitted to a document are placed in a buffer in the order they are received, and in one implementation may be appended to a character string regardless of the manner in which the characters are added—whether as typed letters, as attempts to delete characters, or as part of a cut-and-paste operation. Groups of characters so-entered may be tracked by entries in a table that identify the span of the particular group (e.g., the number of characters in the group) and meta data about the characters, such as whether the text is to be added or removed, the manner in which the characters are to be laid out with respect to paragraph formatting, and the like.

In addition, an entry associated with the characters may point to a format for the characters, which may define, for example, the font of the characters, the font size, and whether the characters are to be in bold face and/or underlined. The format may be expressed as a decimal form of a binary number or another form of a binary number. Each of the positions of the binary number may indicate whether a particular feature is part of the associated format—for example, if the bit at a position in the number that is associated with "bold" is one, then the format defines bold text, and if it is "0," then the format defines non-bold text. Each unique format may be represented, therefore, by a single number, and each group of characters may be associated with a reference to that number. In this manner, format definitions need not be repeated many times for a document.

In certain manners, therefore, the techniques described here may provide a variation of a piece table, to keep track of user operations in an efficient manner and to generate final output for a document for display and storage. In addition, the techniques may permit for efficient undo and redo operations on a document.

In certain implementations, such systems and technique may provide one or more advantages. For example, the techniques just described may provide an efficient mechanism, in the form of a data structure or structures, for storing information about a document such as for use with a word processing application. The data structure may be efficient, in that unformatted data structure takes little space for storage, and in that processing of a continuous series of characters is relatively simple. Such an approach may also be extensible, in that the character content of a document is separated from its layout and formatting, so that additional mechanisms may be added easily to particular implementations, e.g., to address the content without affecting the formatting, to address the formatting on a global basis, and to provide for other such extensions. In addition, such organization of document information may permit, in certain circumstances, for easy generation of an output document in formats such as HTML, RTF, XML, etc. . . . and may also be read easily by different sorts of word processing programs.

In one implementation, a computer-implemented word processing presentation method is disclosed. The method comprises obtaining an unformatted data structure containing a series of characters representing content for a word processing document, accessing a series of first records in a data structure associated with the unformatted data structure file, wherein each first record contains data correlating a location of one or more characters in the unformatted data structure to a location for the one or more characters in the word processing document, and generating a display of the word processing document by applying the correlating data from the series of records to the series of characters in the unformatted data structure. The series of records can comprise records defining character locations in the word processing document, character formats in the word processing document, paragraph locations in the word processing document, and paragraph formats in the word processing document. Also, the series of records can include records in a table describing edits to the word processing document in a chronological order, and generating the display can comprise stepping through the records in the chronological order.

In some aspects, the method further comprises using the first records to identify second records defining formatting for groups of characters in the unformatted data structure corresponding to the first record. In addition, the second records can include binary strings, and particular bits in the binary strings can represent the presence or absence of a particular formatting attribute. Moreover, the series of characters in the unformatted data structure can be ordered according to the order in which they were added to the word processing document, and differently than their order in the displayed word processing document. Each record in the series of records can also define attributes for a contiguous group of characters having a common format.

In other aspects, the method further comprises accessing a series of second records in a data structure associated with the unformatted data structure, and wherein each second record contains data correlating one or more characters in the unformatted data structure to a paragraph format for the one or more characters in the word processing document. The method can also comprise receiving a command to delete characters from the word processing document, and generating a record indicating the deletion of the characters while leaving the unformatted data structure unchanged. Moreover, the method may additionally include receiving a command to add text within the word processing document, appending the added text to the unformatted data structure, and adding a record to the series of first records identifying the location of the added text in the word processing document and in the unformatted data structure. The method may further include receiving a command to add text within the word processing document, appending the added text to the unformatted data structure, and adding a record to the series of first records identifying the location of the added text in the word processing document and in the unformatted data structure.

In another implementation, a tangible computer program storage product that stores instructions is disclosed. When executed, the instructions perform the actions of obtaining an unformatted data structure containing a series of characters representing content for a word processing document, accessing a series of first records in a data structure associated with the unformatted data structure, wherein each first record contains data correlating a location of one or more characters in the unformatted data structure to a location for the one or more characters in the word processing document, and generating a display of the word processing document by applying the data information from the series of records to the series of characters in the unformatted data structure. The product can also store instructions that perform actions comprising receiving a command to delete characters from the word processing document, and generating a record indicating the deletion of the characters while leaving the unformatted data structure unchanged.

In some aspects, the product can further store instructions that, when executed, perform actions comprising receiving a command to add text within the word processing document, appending the added text to the unformatted data structure, and adding a record to the series of first records identifying the location of the added text in the word processing document and in the unformatted data structure. And the product can also store instructions that, when executed, perform actions comprising receiving a command to add text within the word processing document, appending the added text to the unformatted data structure, and adding a record to the series of first records identifying the location of the added text in the word processing document and in the unformatted data structure.

In yet another implementation, a computer-implemented word processing system is disclosed that includes an unformatted data structure storing a series of characters, a character location data structure identifying locations for the placement, in a displayed word processing document, of characters in the unformatted data structure, and a character format file defining formatting information for items in the displayed word processing document. The system can further comprise an edit manager that, in response to a command to edit characters in the word processing document, is programmed to generate an entry in the character location file identifying a location of the edited text in the unformatted data structure, and a location of the edited text in the word processing document that differs from the location in the unformatted data structure. The edit manager can also be programmed to respond to a command to delete characters from the word processing document by adding an entry to the character location file and leaving the deleted characters in the unformatted data structure. Also, each group of contiguous similarly formatted characters in the unformatted data structure is associated with a reference to an entry in the character format file.

In another implementation, a computer-implemented word processing system is disclosed. The system comprises an unformatted data structure storing a series of characters, a character location data structure identifying locations for the placement, in a displayed word processing document, of characters in the unformatted data structure, and means for generating a document for display by applying data in the character location data structure to the series of characters.

The details of one or more embodiments are set forth in the accompanying drawings and the description below. Other features and advantages will be apparent from the description and drawings, and from the claims.

DESCRIPTION OF DRAWINGS

FIGS. 3A, 3B and 3C show an example format bit array that is used for representing a unique format and examples of text formatting attribute arrangement.

FIGS. 4A, 4B and 4C illustrate document text and formatting examples.

FIGS. 5A, 5B and 5C depict data structure and examples for storing editing operations.

FIG. 8 illustrates a file format to persist documents like those discussed herein.

Like reference symbols in the various drawings indicate like elements.

DETAILED DESCRIPTION

Figure 1:
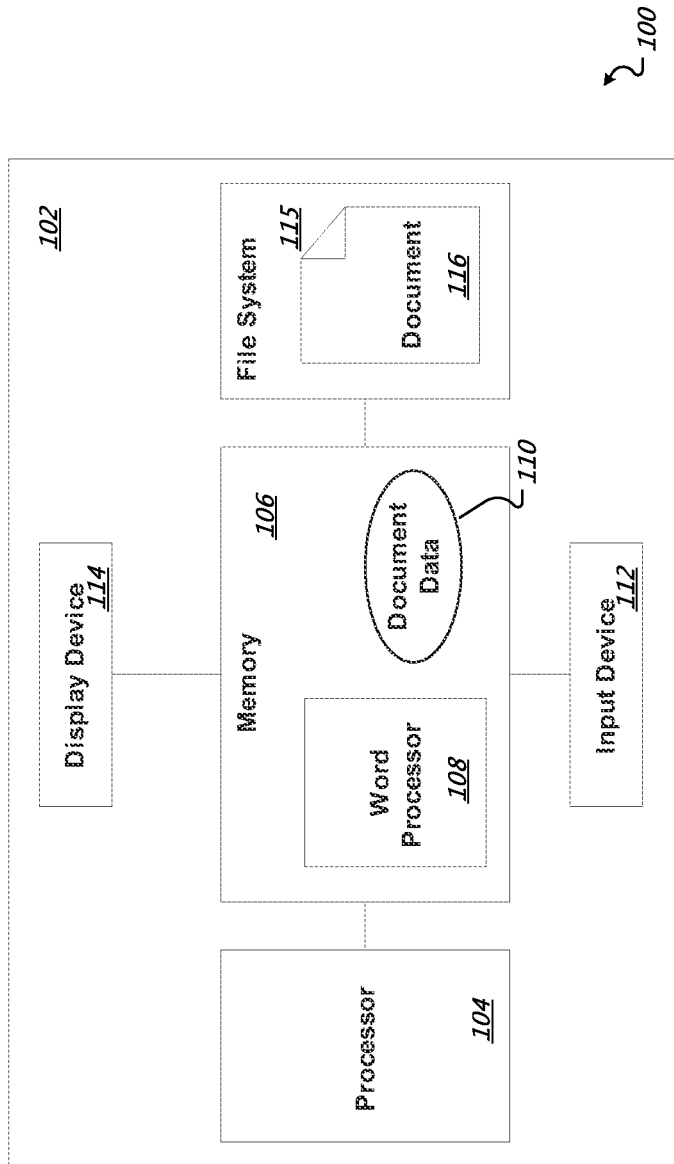
FIG. 1 illustrates a computing environment in which an embodiment of the systems and techniques described here can be implemented.

Referring to the figures, FIG. 1 illustrates a computing environment 100 in which an embodiment of the systems and techniques described here can be implemented. The computing environment 100 includes a computer system 102 having a processor 104 and a memory 106. The memory 106 includes a word processor program 108 (or portions of the word processor program needed at a particular time for proper operation of the program) and document data 110 for a document being edited. The computing environment 100 also includes one or more input devices 112 like keyboard, mouse, touch screen etc. for user input, and a display device 114 for displaying a graphical user interface. Additionally, an external memory, such as a fixed or hard-disk drive, that stores and implements a file system 114 or stores and accesses one or more documents 116 in a persistent fashion, is also included in the computing environment 100.

In operation, a user of the system 102 may ordinarily start with a blank document and may begin typing text into, or speaking into, an input device 112. The text, in the form of alpha-numeric characters and various symbols, may be initially stored in memory 106 as the document data 110. The word processor, which may operate on processor 104, may provide the functionality for such entry and storage of the entered text. In addition, the user may edit the text, change its layout, or add formatting to the text as he or she moves along. Such changes may also be handled by the word processor 108 operating on processor 104, and may be reflected in the document data 104. Periodically, the user or the word processor 108 may determine to save the accumulated data, where such a decision may result in the data being saved as a document 116 in the file system 114, or such a document 116 being updated with newly entered data.

Figure 2:
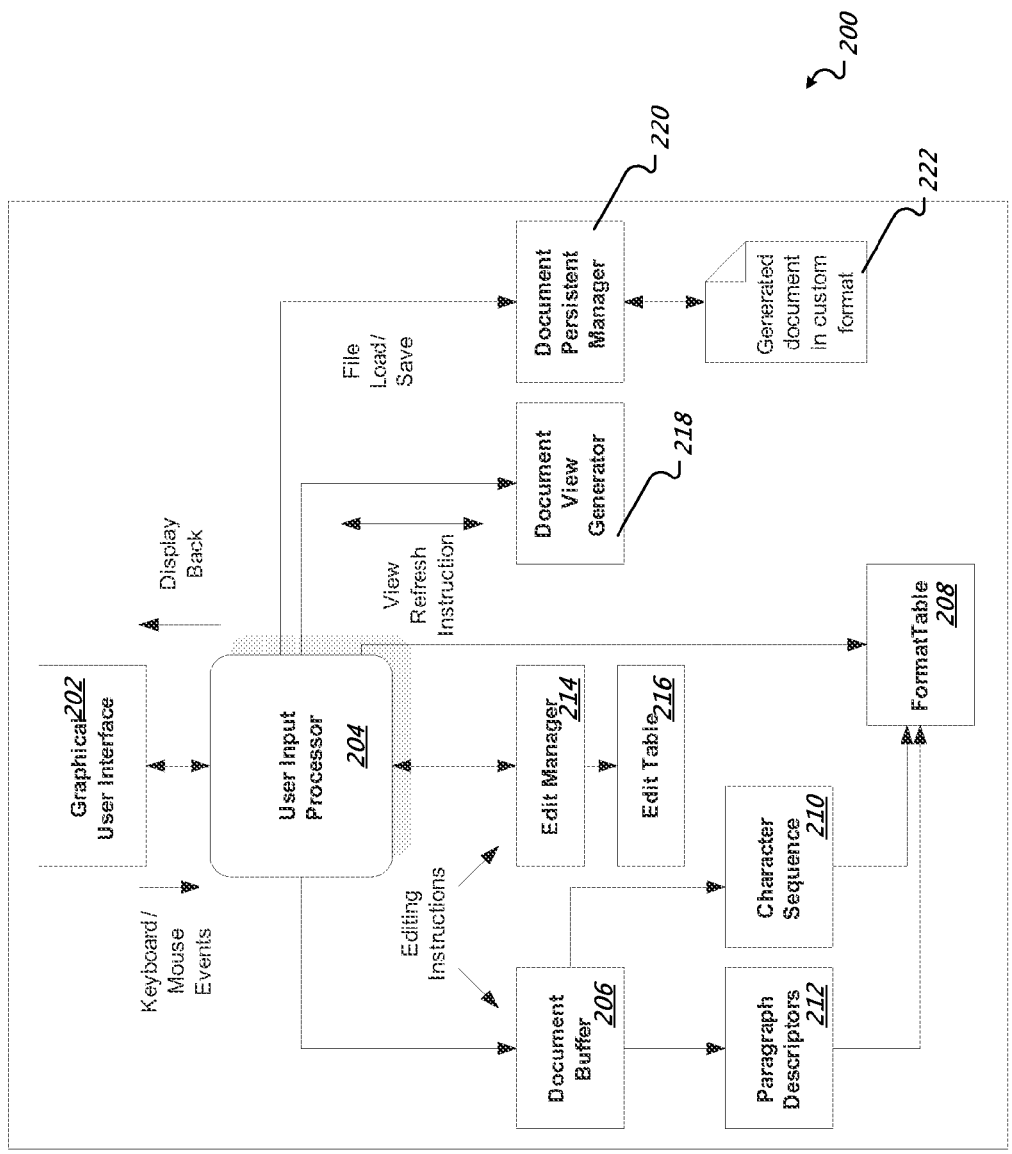
FIG. 2 depicts a block diagram of components of a system for managing entry of data for a document.

FIG. 2 depicts a block diagram of components of a system 200 for managing entry of data for a document. A graphical user interface (GUI) 202 allows users to input text and editing commands such as insert, delete, and update, in addition to commands for formatting the text. Although shown as involving keyboard and mouse events, the input may take a wide variety of forms including speech input that may be transcribed to text by a separate sub-system before it is provided to a word processor. A user input processor 204 deciphers the user commands in a familiar manner and processes those commands for submission to other components in the system 200.

A document buffer 206 contains the document being edited in append-only mode in this example. In particular, when a user enters and edits text through the GUI 202, new text is added to the end of the document buffer 206, whereas when a user deletes text, the document buffer does not change. Rather, as described in more detail below, flags or markers directed at the text may be added to the system to indicate that particular text in the buffer is not to be displayed as part of the document because, e.g., it has subsequently been deleted or moved.

Figure 4A:
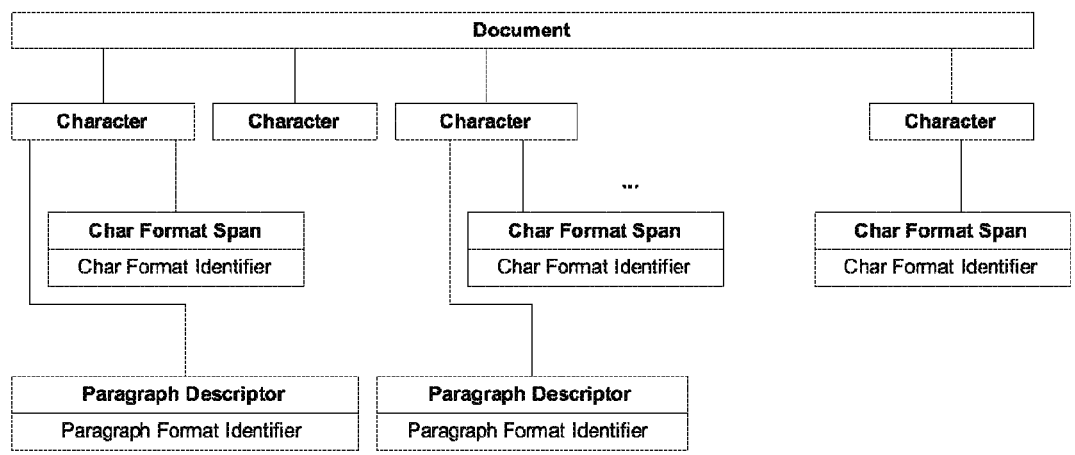

As shown in FIG. 4A, the document that the document buffer 206 holds is a sequence of characters. The document buffer 206 can also contain a sequence of character format spans and paragraph descriptors. In this example, a character format span contains a reference to a format identifier for the text and the length of the character sequence that this format applies to. The paragraph descriptor contains the length of the paragraph, in the document buffer, and its associated format identifier. In essence, the paragraph descriptors describe the blocks in the document, while the character format spans describe the contiguous group of characters that have a common format.

In other words, the document organization shown in the figure is based around a series of contiguous characters. Where the format and/or paragraph structure of the characters changes, there are, respectively, character format spans with character format identifiers that identify what the next group of contiguous characters is to look like and how long the group is, and paragraph descriptors and paragraph format identifiers that identify the general paragraph-level formatting for the characters. This organization thus ties a raw textual string of characters which, after editing in an append-only system, may not look anything like a comprehensible document, to the layout and formatting information need to make the characters comprehensible as a complete document, and to give the characters special forms (e.g., bold and underline).

Referring again to FIG. 2, the format table block 208 represents the list of all the unique formats used in the document. The character sequence 210 and paragraph descriptors from the document buffer 206 may refer to the format table as an efficient way of identifying format information for a particular group of characters. In particular, the format table 208 may contain codes that are short-hands for particular combinations of formatting, and the paragraph descriptors 212 and/or character sequence may reference the format table 208 to link those formats to particular character groups. In this manner, each unique format can be defined once in the format table 208, thus making changing of the format simpler, and saving space because the format definition can be represented a single time and cross-referenced by a simple number or similar token from various character sequences that use that format.

A format can be a combination of more than one formatting attribute—for example, a font, font size, boldness, italics, and other such font attributes. Each format in this example is represented by an eight bit array as shown in FIG. 3A and is identified by a unique identifier. The format identifier can be generated using any appropriate algorithm or technique, but the illustration here uses the actual integer value of a particular format.

Examples of such a format representation are shown in FIGS. 3B and 3C, which follow the structure shown in FIG. 3A. For example, in FIG. 3B, the value of the 8-bit format representation is 00001110, or simply 1110—representing that the format is bold (bit 1 equals 1), italicized (bit 2 equals 1), and underlined (bit 3 equals 1). The decimal representation of such a number, and thus the format identifier in this example, is 14.

Likewise, in FIG. 3C, the 8-bit number is 00100001, or simply 100001. Here, the reserved 0th bit is equal to 1, indicating that the format relates to a paragraph rather than to a character group (which is the case when the bit is 0). As a result, the formatting from the second row in FIG. 3A applies here, so that the value of 1 at the 5th bit position indicates that the relevant text is part of an ordered list. Although the particular identifiers are shown here for purposes of illustration as 8-bit arrays, other mechanisms for representing formats may also be employed. For example, higher-bit representations may be used where a large number of formats is needed.

The character format spans and the paragraph descriptors in a document buffer can be generated so as to refer to the format identifiers in the format table 208. As a result, when a format is applied to some text in the document, the format table 208 can be searched to see whether the new format exists. If the format doesn't exist, a new entry can be added to the format table 208, and the identifier for the new entry may be associated with the corresponding content. If the format already exists, the characters can be assigned an identifier for that existing format. As needed, obsolete formats can be purged from the format table, such as at regular intervals or during a document save operation.

Figure 4B:
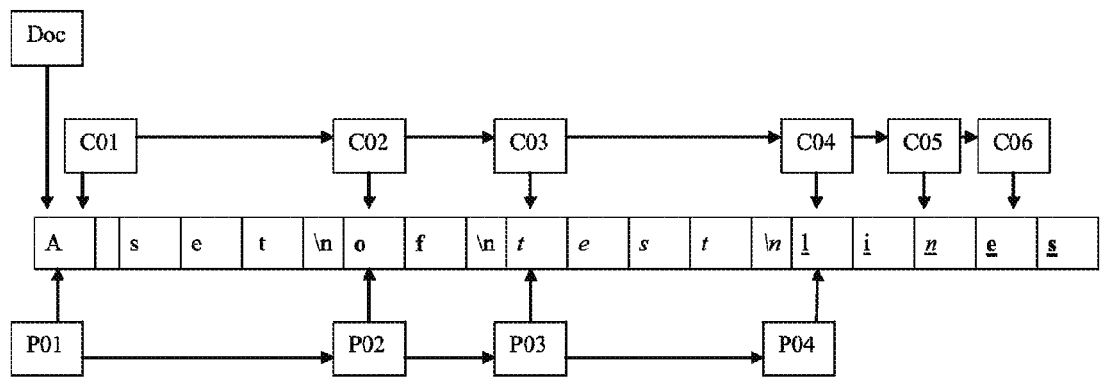

FIG. 4B provides an example of the document data structure usage. In this example, the characters for a document are shown in each of the cells in the middle of the figure, with a main document identifier shown at the beginning of the relatively short example document, character references above the characters, and paragraph references below the character. Thus, for example, the first block of character, up to the start of the word "of" have a single format, whereas the next word, "of," has a different format. Each span of characters may be identified in a manner like that shown in FIGS. 5A and 5C, described in more detail below. Also, each word in the string of characters makes up its own paragraph, so that each paragraph descriptor has a span of one word (and a space between words), and may be represented in a manner like that shown in FIGS. 5B and 5C, described in more detail below.

This example technique for representing a document treats a document not just as a plain sequence of characters or a tree of objects of different format types, but as a sequence of characters where each sequence contains a reference to its formatting attributes. Having a character sequence that knows its formatting can make the manipulation and display generation simple and efficient.

FIG. 4C provides an example illustrating the states of document buffer 206 of FIG. 2 during text editing. As is evident in the example, the document buffer is an append-only data structure. The example in FIG. 4C also juxtaposes the buffer content with the text that would be viewable with the application, to assist in understanding the operation of this particular example. Specifically, at step 1, no text has been entered, the buffer is empty, and the system shows nothing to the user. In step 2, the user has entered a contiguous set of text, the buffer shows the characters in that text, and the system displays the same. At step 3, the user deletes the last word of the entered sequence and adds a different word. Here, the character string leaves the deleted word in place, because it is append-only, and adds the new word after the deleted word. Although the deleted word is still in the buffer, it is prevented from being displayed, as described in more detail with respect to FIG. 5C below. At step 4, another word is inserted in the middle of the sequence of characters, such as by the user moving their pointer to the middle of the sequence with a mouse. Because the document buffer is append-only, the word that is typed at that location is, however, appended to the end of the sequence of characters. However, a formatting table associated with the entered text points to the proper location so that when the text is addressed when the document is to be rendered, it may be displayed in the appropriate location.

Referring again to FIG. 2, edits to the document made by a user of the system 200 are handled by an edit manager 214, which stores the edit information in an edit table 216, while added characters are provided to the document buffer 206. For example, deletions of words would not be reflected in the document buffer in this example, while they would be reflected in the edit table 216. FIG. 5A presents an example of such an edit table for storing character editing operations, while FIG. 5B presents examples of data tables that store character format and paragraph editing operations. The edit table 216 in FIG. 2 collectively refers to a character edit table, a character format edit table, and a paragraph edit table. The system 200 in this example uses three different data tables instead of using just one for effective memory usage.

The paragraph edit table information includes the paragraph index in the document buffer 206, the selection start, i.e., the cursor position in the GUI, the number of paragraphs inserted, and the number of selected paragraphs. The character format edit table information includes the insert position of the format span in the document buffer 206, the count of inserted format spans, the selection start, and the number of selected format spans. The character edit table information includes the insertion position of the text in the document buffer 206, the total length of the inserted text, the selection start, the length of the selected text, the length of the removed text, the index of the paragraph edit entry in the paragraph edit table, and the index of the character format span edit entry in the character format edit table.

FIG. 5C presents an example of how these tables are affected during editing operation. At step 1, a user types two words that comprise five characters separated by a space. Thus, the insert position is 0 (because this is the first text) and its insert length is 6 characters. Likewise, for the paragraph edit table, the insert position is zero also, and one paragraph is inserted. At step 2, the user adds a new word in the middle of the initial sequence of characters. This action has no affect on paragraph formats, so the paragraph edit table needs no new entry. However, it adds seven characters at the second position of the file, but the sixth position of the buffer. At step 3, the user deletes a space in the middle of the text. As shown by the new third entry in the character table under step 3, this action occurred at the thirteenth position of the buffer (eighth position of the displayed document), had no insert length, but had a remove length of one. Finally, at step 4, the user presses the enter key, thus implicating the paragraph edit table. Thus, for the character, the paragraph edit index is assigned a value of one, the location in the buffer is again thirteen, and the insert length of the hard return is one character. Because the character table refers, for this entry, to the paragraph edit table, an entry is also added to the paragraph entry table. This entry shows an insert position of one (it is the second paragraph) with an insert count of two and a selection count of 1.

Figure 6:
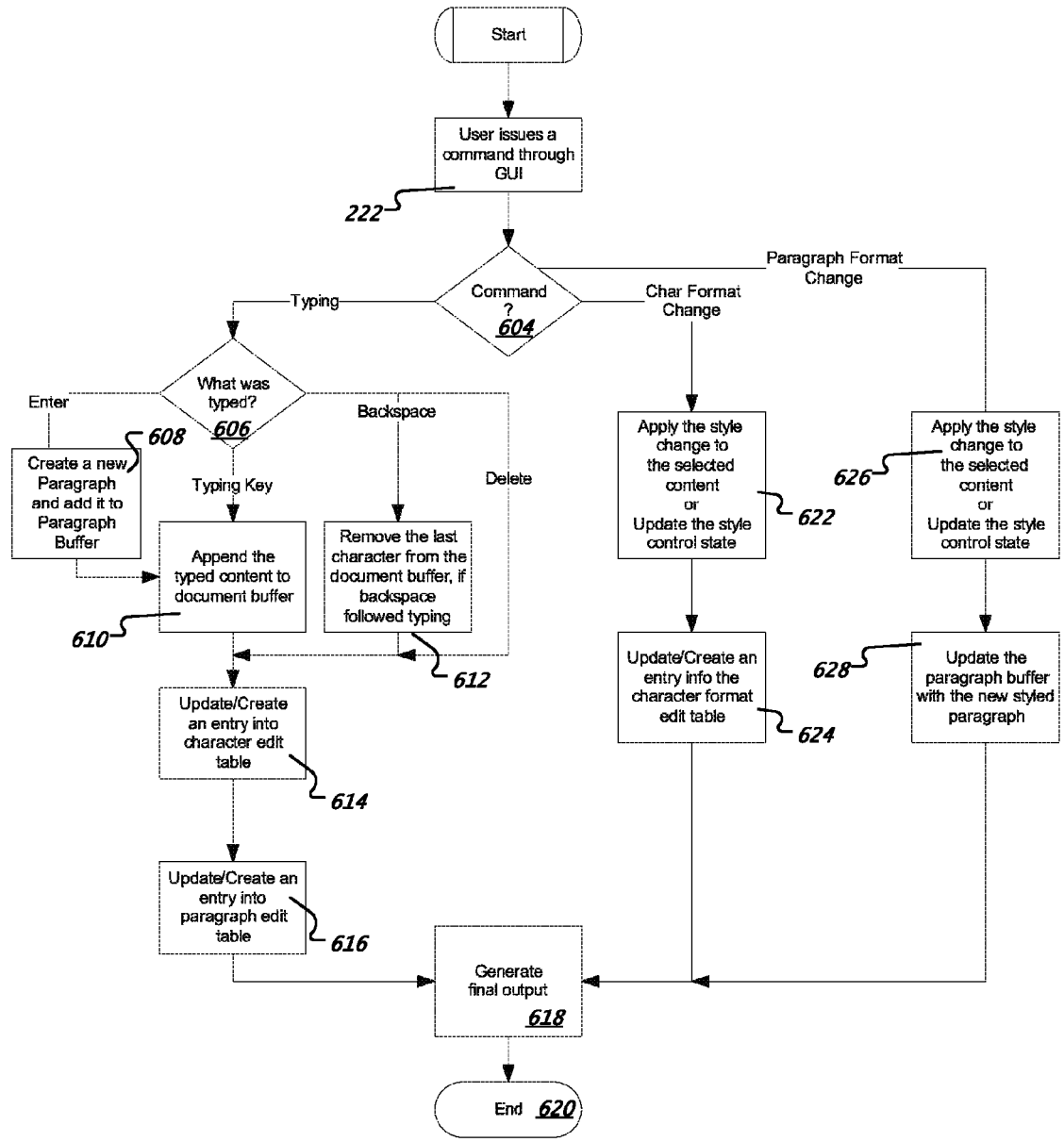
FIG. 6 illustrates a flow chart illustrating flow control for handling editing operations.

FIG. 6 illustrates a flow chart illustrating flow control for handling editing operations. The editing operations include insertion, deletion, update, formatting, copy/cut/paste, undo-redo, and document save and load. This diagram only depicts the typing (i.e. insertion, deletion, and update) and formatting operations. In this example, the document buffer is append-only, so that all operations except for the backspace result in appending characters/paragraphs into the buffer.

At box 602, a user issues a command through a GUI, such as by deleting text, typing text, providing text through a voice recognition application, by selecting a menu item or icon, or by some other technique. The process then determines what type of command it is, at decision box 604. If it is a typing command (e.g., the addition of one or more characters, including spaces), then the process determines what was typed (box 606). If the enter, or hard return, key was pressed, then the process creates a new paragraph and adds an entry for the paragraph to the paragraph buffer (box 608). If the user typed a key, that typed content is appended to the character buffer (box 610). If the user pressed a backspace key, the last character is removed from the document buffer if the backspace followed typing by the user (box 612). If the key was a pressed delete, the process simply continues.

After addressing the particular type of key entry, the process updates or creates an entry for the character edit table (box 614), such as in the manners discussed above. And the process then updates or creates an entry for the paragraph edit table, if necessary (box 616).

If the command, instead of being one or more keystrokes, was a change in character format (such as by the user selecting a group of text and then selecting an icon to make the text bold or italicized), the new style is applied to the selected characters or the style control state is updated. The process then creates or updates an entry for the text in the character format edit table (box 624).

Where the command is instead a paragraph format change, the process applies the style change to the selected characters content to update the style control state (box 626). The process then updates the paragraph buffer with the new styled paragraph.

At the end of any of these editing processes, the process generates a final output 618 by re-rendering part or all of the document for display to the user (box 618), and the process ends (box 620) until further input is receive from the user. Thus, at the end of each such editing cycle, the character edit table, the paragraph edit table, and/or the character format edit table are updated, as is the buffer, so as to recreate the document to reflect the particular edits.

The recreation of the document 222 may be conducted, e.g., by a document view generator 218 (see FIG. 2) and document persistent manager 220. Such generation may occur by stepping down through the various entries in the tables such as the character edit table (and by extension the paragraph edit table). The character position information from such a table enables a document generation process to step carefully through the characters in the buffer or other, as each entry in the table identifies particular locations in the buffer for the characters. Also, because the buffer and the tables are both arranged according to the chronological building of the document, reading them in the order they were built also provides for a simple and logical mechanism to construct a document for display.

FIGS. 4C and 5C depict a document buffer such as document buffer 206 and the edit table states that occur during typing operations. When the format of text is changed, a new entry is created in the character format edit table. This avoids content duplication and enables the undo-redo on formatting change operations.

Figure 7A:
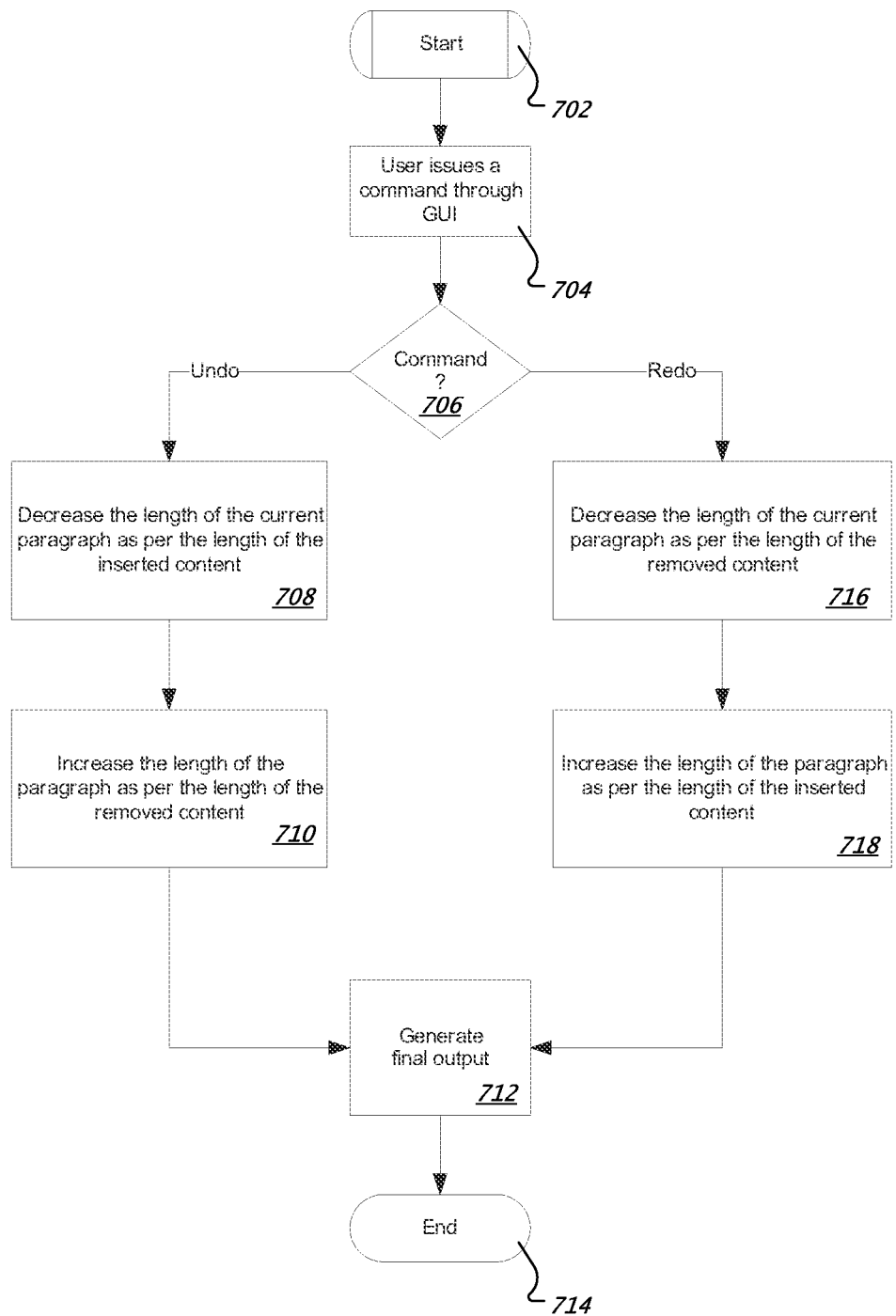
FIG. 7A illustrates a flow chart illustrating flow control for handling undo-redo operations.

FIG. 7A illustrates a flow chart illustrating flow control for handling undo-redo operations. As shown there, at box 702, the process starts, and at box 704, a user issues a command. At box 706, the process determines whether the command is an undo command or a redo command. If it is an undo command, then the process decreases the length of the current paragraph (where the operation is undoing operations within a paragraph) as per the length of the inserted content (box 708) and then increases the length of the paragraph as per the length of the removed content (box 710). If the command is a redo command, generally inverse operations are performed (boxes 716 and 718). Under either option, the final output is then generated (box 712) for review by the user, and the process ends (714).

Figure 7B:
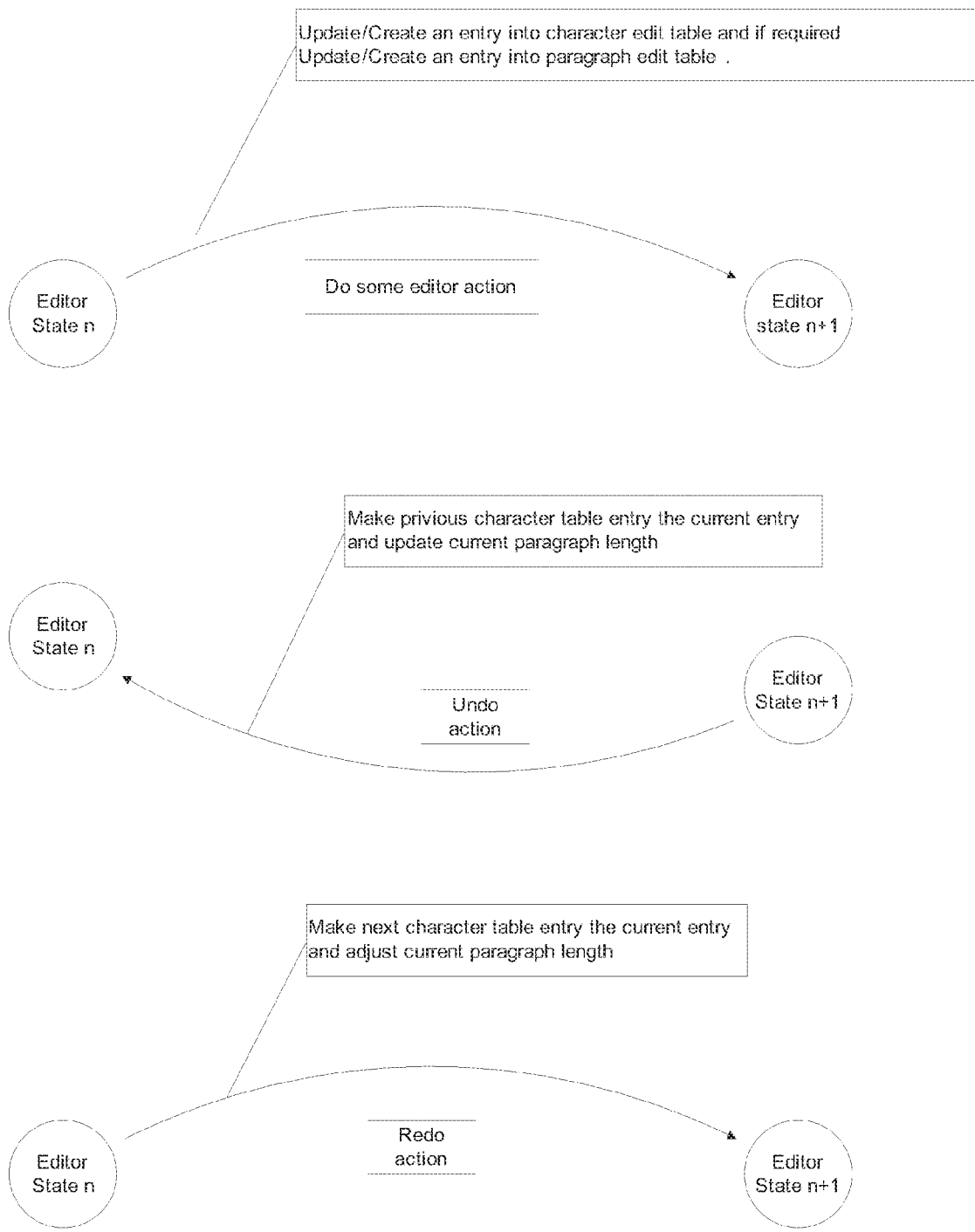
FIG. 7B depicts program states during undo-redo.

FIG. 7B depicts program states during undo-redo. The edit operations are stored in character, character format, and paragraph edit tables as depicted in FIGS. 5A, 5B and 5C. The undo command undoes the effect of the last operation in the editor. The undo results in decrementing the paragraph length according to the inserted content size. If the operation being undone involved removal of some content, then it also re-adds the size of the removed content to the paragraph size. The redo command does the reverse, i.e., it decreases the size of the paragraph as per the removed content size and increases the size of the paragraph as per the inserted content size.

FIG. 8 illustrates a file format to persist documents like those discussed herein. The document persistent manager depicted in FIG. 2 handles the document file generation and loading. The illustrated XML file format makes the document readable by most word processors.

Figure 9:
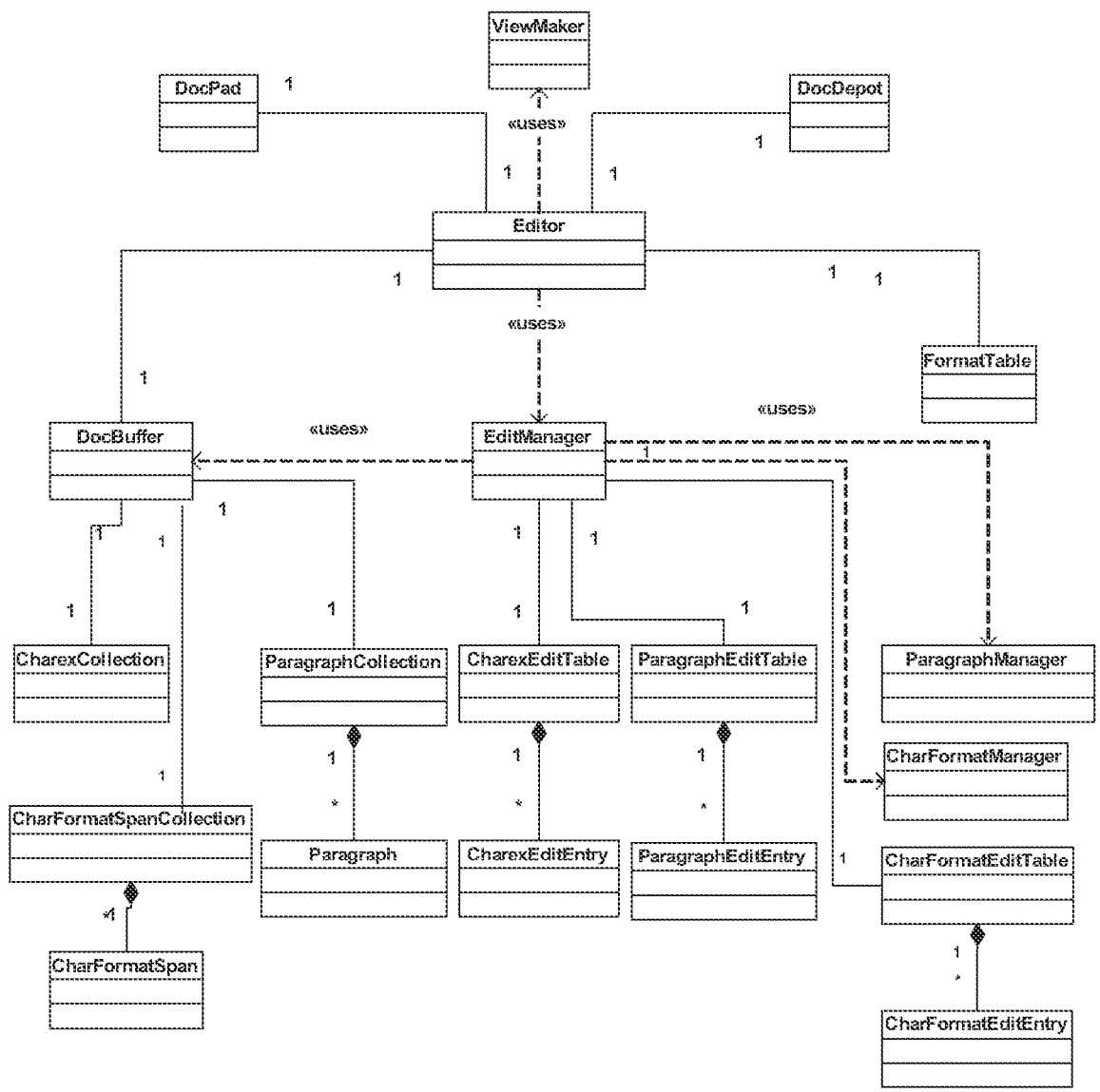
FIG. 9 illustrates example class diagrams of a program like that discussed here.

FIG. 9 illustrates example class diagrams of a program like that discussed here. The CharFormatSpan object is the smallest unit of the document and it contains a reference to character format and the length of the characters, in the document buffer, that the format applies to. FormatSpanCollection is a collection of CharFormatSpan objects which stores the sequence of character format spans. CharexCollection stores the sequence of characters. The Paragraph object contains the size of a paragraph in the document buffer and the reference to its format in the format table. The ParagraphCollection is a collection of Paragraph objects which is used to store the sequence of paragraphs. The DocBuffer along with the CharexCollection, CharFormatSpanCollection, and ParagraphCollection maintains the current character and paragraph formats. The next inserted character or paragraph takes the current active formats.

The CharexEditEntry, CharFormatEditEntry, and ParagraphEditEntry objects shown in FIG. 9 represent the information that is recorded for character, format and paragraph editing operations respectively. FIGS. 5A and 5B list the properties of these three objects and FIG. 5C provides an example of their usage. The CharexEditTable contains the list of CharexEditEntry objects, the CharFormatEditTable contains the list of CharFormatEditEntry objects, and the ParagraphEditTable contains the list of ParagraphEditEntry objects. These lists are required to remember all the editing operations for supporting unlimited undo-redo capability. The EditManager object, along with the CharFormatManager and ParagraphManager objects, manages the edit tables and provides the undo-redo functionality.

The FormatTable object shown in FIG. 9 contains the formats used in example documents like those discussed here. FIGS. 3A, 3B and 3C show the properties of an example FormatTable object and examples of its usage.

The Editor object in FIG. 9 represents the user input processor 204 in FIG. 2. This is the core component of the method in this example, that via other objects processes the user commands, updates the display, and facilitates the undo-redo and document save and reload. The DocPad is the GUI for the word processor that contains the pad for entering the text and controls for editing the document text and format. The DocDepot object implements the document save and reload functionality. The ViewMaker object generates the final output for view and store using the DocBuffer, EditManager, and the FormatTable. The output for view is fed to the DocPad for presentment and to DocDepot for persisting.

A number of embodiments have been described. Nevertheless, it will be understood that various modifications may be made without departing from the spirit and scope of the invention. For example, much of this document has been described with respect to television advertisements, but other forms of data structures and relationships between and among data structures may also be addressed.

In addition, the logic flows depicted in the figures do not require the particular order shown, or sequential order, to achieve desirable results. In addition, other steps may be provided, or steps may be eliminated, from the described flows, and other components may be added to, or removed from, the described systems. Accordingly, other embodiments are within the scope of the following claims.

What is claimed is:

1. A computer-implemented method comprising:
    receiving, at a computer system, first information that describes first input provided to a user interface of an application displaying a word processing document;
    accessing, by the computer system, an edit table and a format table that are associated with the word processing document, wherein the edit table comprises entries that correlate portions of text to locations in the word processing document and the format table comprises format entries that each define a unique format to be applied to a portion of text in the word processing document;
    identifying, by the computer system, the first input as a first type of command to adjust textual content at a first location in the word processing document to have a particular format;
    selecting, in response to the identifying, a particular format entry from the format table that corresponds to the particular format;

identifying an entry in the edit table that corresponds to the textual content;
modifying the entry in the edit table to refer to the particular format entry selected from the format table for the textual content; and
providing, by the computer system, a first indication that the edit table has been updated.

2. The computer-implemented method of claim 1, wherein the particular format entry comprises a binary value in which particular bits correspond to one or more formatting attributes.

3. The computer-implemented method of claim 2, wherein the one or more formatting attributes include one or more of: a font type, a font size, bold, italics, and underline.

4. The computer-implemented method of claim 1, wherein providing the first indication causes the word processing document to be re-rendered in a display using the modified entry in the edit table, resulting in the textual content being displayed with the particular format.

5. The computer-implemented method of claim 1, wherein the first information is received from a client computing device that is separate from the computer system and that presents the user interface through which the first input was received.

6. The computer-implemented method of claim 1, further comprising:
as a result of the computer system identifying that the format table does not include a format entry for the particular format, creating the particular format entry based on the particular format and adding the particular format entry to the format table,
wherein the particular format entry comprises a plurality of bits, at least a portion of which each represent a Boolean value that indicates whether a corresponding textual style is included as part of the particular format.

7. The computer-implemented method of claim 1, wherein:
the entry in the edit table further correlates a position of the textual content in a document buffer to the first location in the word processing document, and
the document buffer comprises text of the word processing document in a chronological order based on when the text was entered into the word processing document.

8. The computer-implemented method of claim 7, wherein the entry in the edit table further identifies (i) a starting position of the textual content in a document buffer and (ii) a length of the textual content in the document buffer.

9. The computer-implemented method of claim 7, further comprising:
receiving, at the computer system, second information that describes second input provided to the user interface;
accessing, by the computer system, the document buffer and the edit table;
identifying, by the computer system, a second type of command that is associated with the second input;
in response to identifying the second type of command as a command to modify the textual content in the word processing document, updating the entry that corresponds to the textual content to correlate a modified position of the textual content in the document buffer with a modified location of the textual content in the word processing document; and
providing, by the computer system, a second indication that the edit table has been updated.

10. The computer-implemented method of claim 9, wherein the command to modify the textual content comprises a command to change, move, or delete some or all of the textual content in the word processing document.

11. A system comprising:
one or more computing devices;
an interface of the one or more computing devices that is programmed to receive first information that describes first input provided to a user interface of an application displaying a word processing document;
a storage device accessible by the one or more computing devices that is programmed to store an edit table and a format table that are associated with the word processing document, wherein the edit table comprises entries that correlate portions of text to locations in the word processing document and the format table comprises format entries that each define a unique format to be applied to a portion of text in the word processing document; and
a user input processor of the one or more computing devices that is programmed to:
identify the first input as a first type of command to adjust textual content at a first location in the word processing document to have a particular format;
select, in response to the identification, a particular format entry from the format table that corresponds to the particular format;
identify an entry in the edit table that corresponds to the textual content;
modify the entry in the edit table to refer to the particular format entry selected from the format table for the textual content; and
provide a first indication that the edit table has been updated.

12. The system of claim 11, wherein the particular format entry comprises a binary value in which particular bits correspond to one or more formatting attributes.

13. The system of claim 12, wherein the one or more formatting attributes include one or more of: a font type, a font size, bold, italics, and underline.

14. The system of claim 11, wherein providing the first indication causes the word processing document to be re-rendered in a display using the modified entry in the edit table, resulting in the textual content being displayed with the particular format.

15. The system of claim 11, wherein the first information is received from a client computing device that is separate from the one or more computing devices and that presents the user interface through which the first input was received.

16. The system of claim 11, wherein the user input processor is further programmed to:
as a result of the computing devices identifying that the format table does not include a format entry for the particular format, create the particular format entry based on the particular format and adding the particular format entry to the format table,
wherein the particular format entry comprises a plurality of bits, at least a portion of which each represent a Boolean value that indicates whether a corresponding textual style is included as part of the particular format.

17. The system of claim 11, wherein:
the entry in the edit table further correlates a position of the textual content in a document buffer to the first location in the word processing document, and
the document buffer comprises text of the word processing document in a chronological order based on when the text was entered into the word processing document.

18. The system of claim 17, wherein the entry in the edit table further identifies (i) a starting position of the textual content in a document buffer and (ii) a length of the textual content in the document buffer.

19. The system of claim 17, wherein the user input processor is further programmed to:
- receive second information that describes second input provided to the user interface;
- access the document buffer and the edit table;
- identify a second type of command that is associated with the second input;
- in response to identifying the second type of command as a command to modify the textual content in the word processing document, update the entry that corresponds to the textual content to correlate a modified position of the textual content in the document buffer with a modified location of the textual content in the word processing document; and
- provide a second indication that the edit table has been updated.

20. The system of claim 19, wherein the command to modify the textual content comprises a command to change, move, or delete some or all of the textual content in the word processing document.

* * * * *